United States Patent [19]

Damm

[11] 4,441,730
[45] Apr. 10, 1984

[54] STEERING DEVICE FOR MANY-AXLED GOOSE-NECK TRAILERS

[76] Inventor: Sverre Damm, Gamleveien 1, N-1473 Skårer, Norway

[21] Appl. No.: 320,956

[22] PCT Filed: Mar. 10, 1981

[86] PCT No.: PCT/NO81/00006
§ 371 Date: Nov. 6, 1981
§ 102(e) Date: Nov. 6, 1981

[87] PCT Pub. No.: WO81/02554
PCT Pub. Date: Sep. 17, 1981

[30] Foreign Application Priority Data

Mar. 11, 1980 [NO] Norway .................. 80/0682

[51] Int. Cl.³ .......................................... B62D 53/06
[52] U.S. Cl. .................................. 280/426; 280/814; 280/442
[58] Field of Search ............... 280/426, 442, 404, 408, 280/81 R, 81 A

[56] References Cited

U.S. PATENT DOCUMENTS

| | | | |
|---|---|---|---|
| 2,741,489 | 4/1956 | Bigge | 280/405 A |
| 3,284,094 | 11/1966 | Grace | 280/81 |
| 3,520,549 | 7/1970 | Delay | 280/81 R |
| 3,591,203 | 7/1971 | Steiner | 280/426 |
| 3,656,776 | 4/1972 | Steiner | 280/81 A |

FOREIGN PATENT DOCUMENTS

| | | | |
|---|---|---|---|
| 845448 | 7/1949 | Fed. Rep. of Germany . | |
| 2263506 | 1/1972 | Fed. Rep. of Germany . | |
| 2312565 | 9/1974 | Fed. Rep. of Germany | 280/426 |
| 362223 | 3/1974 | Sweden . | |

*Primary Examiner*—Joseph F. Peters, Jr.
*Assistant Examiner*—Donn McGiehan
*Attorney, Agent, or Firm*—Fleit, Jacobson, Cohn & Price

[57] ABSTRACT

Steering device for a multi-axled goose-neck trailer which is coupled with a vehicle in front of the trailer, the steering device comprising wheels pivotable about a main axle and connected to stay rods for forcibly steering the wheels. These stay rods are each connected to an intermediate member which is also connected to a double piston rod, the ends of which are adapted for receiving a hydraulic signal from the vehicle, thereby steering the wheels.

5 Claims, 3 Drawing Figures

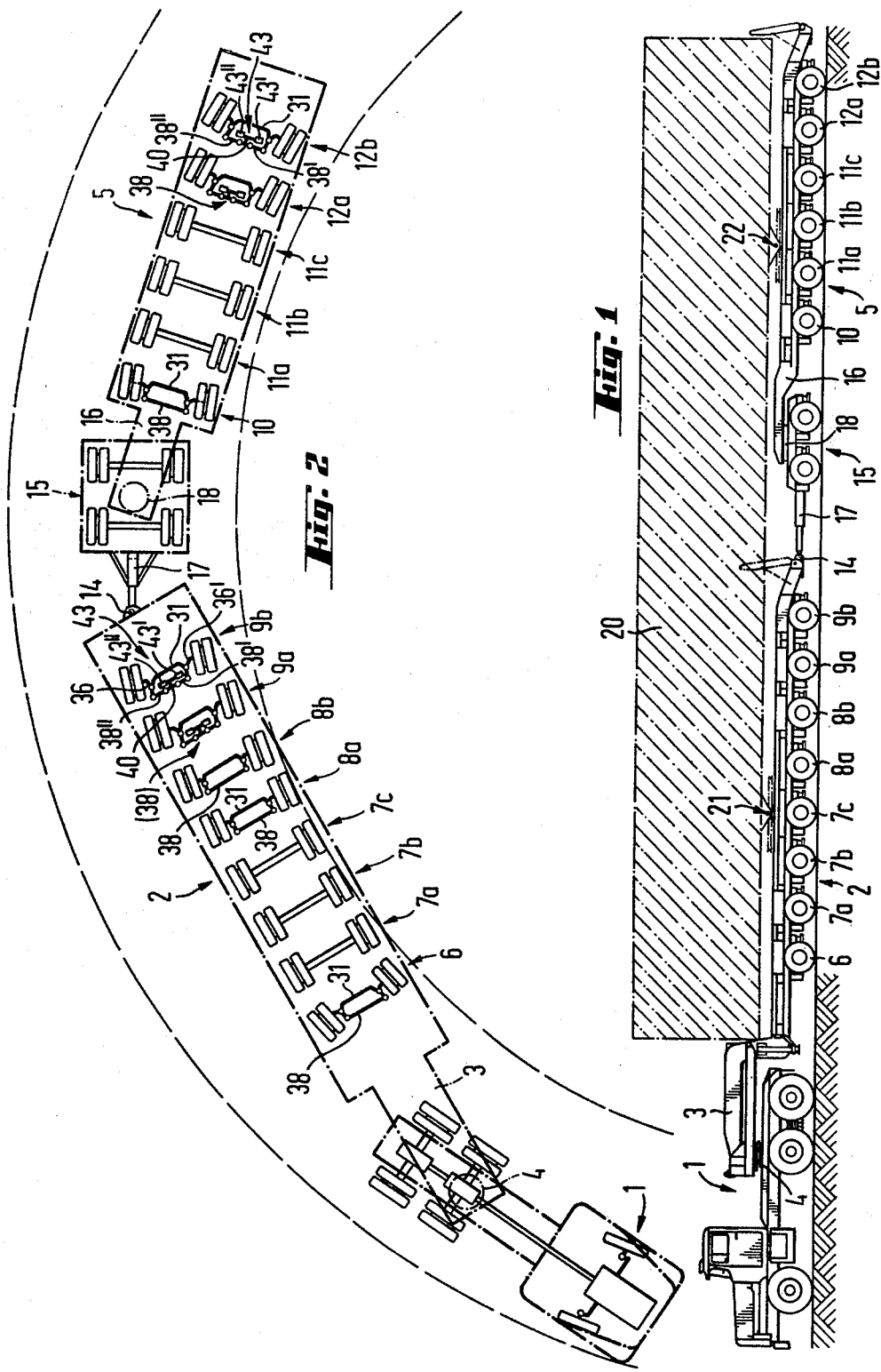

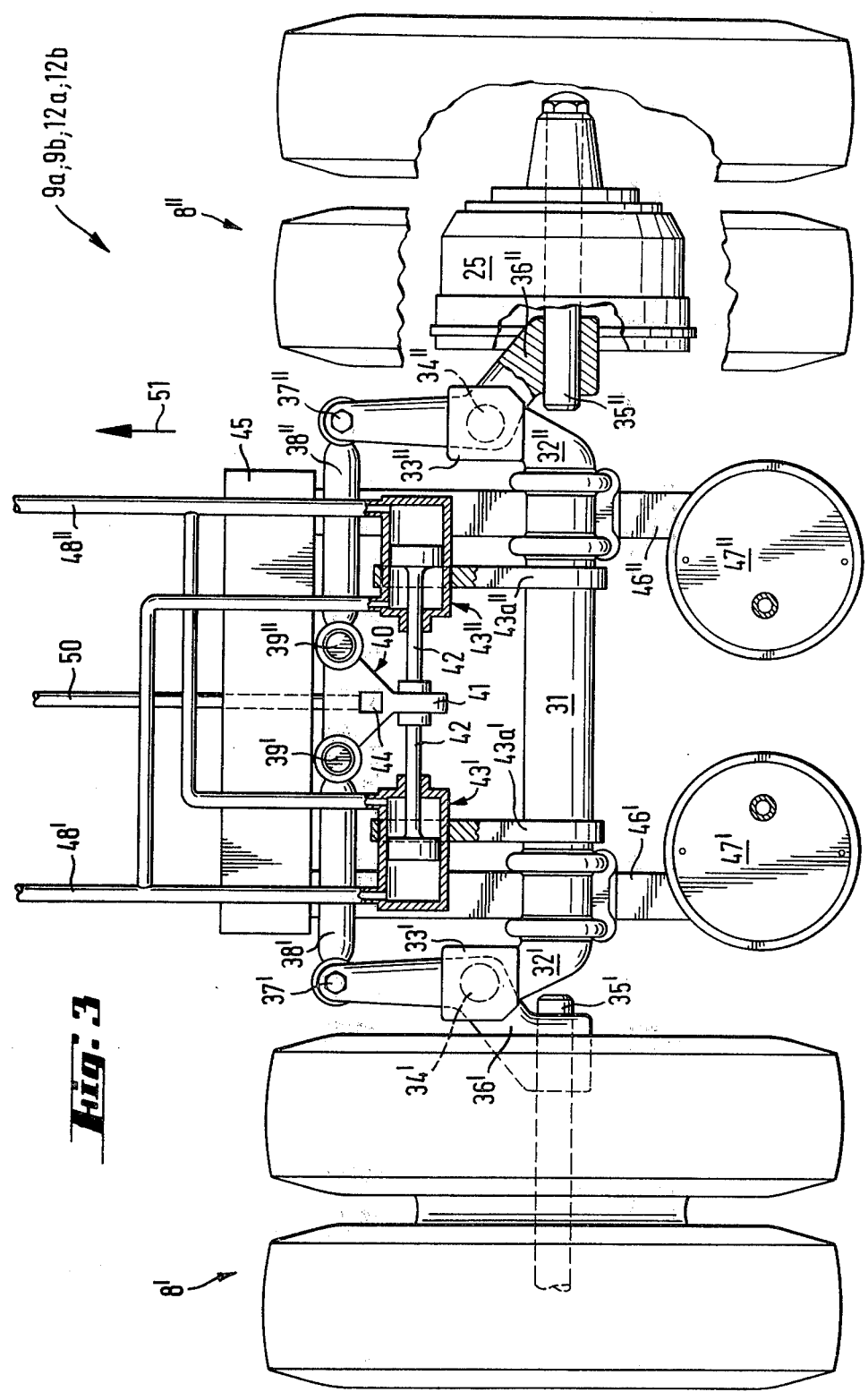

STEERING DEVICE FOR MANY-AXLED GOOSE-NECK TRAILERS

BACKGROUND OF THE INVENTION

1. Field of the Invention

This invention relates to a steering device for many-axled goose-neck trailers which are coupled behind a tracking vehicle, behind another trailer or behind a dolly, the goose-neck of the trailer being coupled with a vehicle in front of it via a pivotable and tiltable disc which, when driving in curves, by means of a transmission, forcibly steers the rear wheel set in a direction opposite to the steering wheels of the tracking vehicle, so that the trailer more closely follows the track of the tracking vehicle.

2. Description of the Prior Art

When a many-axled trailer is coupled behind a tracking vehicle or behind another trailer, according to the Road Authorities, such trains of vehicles, for safety reason, are only allowed to travel at limited speed, and the aim of the invention is to enable such vehicle trains to drive at the maximum speed permitted for the road in question.

SUMMARY OF THE INVENTION

According to the invention this is made possible by a device wherein the front wheels of the trailer, in a manner known per se, are steered by friction against the road, and, in addition thereto, the rearmost are forcibly steered through said transmission.

When a train of vehicles, such as a tracking vehicle or tractor and two many-axled goose-neck trailers, the first coupled by its goose-neck to the tractor via a pivotable and tiltable disc—often called "the fifth wheel"—and the second trailer coupled with the first one in the same way, or via a dolly coupled behind the first trailer and also provided with a fifth wheel, is driving along a road of good quality, the friction-steered wheel sets are sufficient to assure that both trailers follow the track of the tractor. However, when the road is slippery or of poor quality, such as a sandy pavement, the friction-steering may not function satisfactorily. In order to obtain full safety under such dangerous conditions, according to the invention, the rearmost wheels are forcibly steered.

Consequently, the following benefits are obtained by the invention:

1. It is possible to drive with full speed corresponding to the road speed limits with one or more fully-loaded trailers behind one single tractor.
2. The pay-load can be substantially increased.
3. Transportation of goods of exceptional length is possible without restriction of the speed.
4. The system results in double security on the road since the forcible steering of the rear wheels will act even if the road is slippery.

According to a further feature of the invention one or more of the friction-steered sets of wheels are provided with a reverse lock which is controlled from the wheel house of the tractor. Thereby the vehicle train may also be safely reversed.

BRIEF DESCRIPTION OF THE DRAWINGS

The invention is to be explained in the following with reference to the drawings in which:

FIG. 1 shows a vehicle train as seen from the side;

FIG. 2 shows the same vehicle train in plan view when driving in a sharp bend; and FIG. 3 shows one of the rear wheel bogies with steering device and reverse lock.

DESCRIPTION OF THE PREFERRED EMBODIMENT

In FIGS. 1 and 2 is shown a vehicle train consisting of a tractor 1, behind which a many-axled goose-neck trailer 2 is coupled via its goos-neck 3 and a pivotable and tiltable disc 4, the fifth wheel, on the tractor. Behind said trailer 2 is connected a four-wheel dolly 15 which is also provided with a fifth wheel 18 to be connected with the goose-neck of a second many-axled goose-neck trailer 5. The first trailer 2 has eight axles and the rear trailer has six axles. Of the wheel sets of the trailers 2 and 5 the first set 6 and 10, respectively, is steered by friction against the road, and so are also the rear wheel sets 8a, 8b, of trailer 2. In addition thereto the rearmost wheel sets 9a, 9b and 12a, 12b, respectively, are, as known per se, forcibly steered from the respective fifth wheels 4 and 18 with which the gooseneck 3 and 16, respectively, are coupled. The three intermediate wheel sets of both trailers, namely 7a, 7b, 7c and 11a, 11b, 11c, respectively, are not steered.

FIG. 1 shows an exceptionally long load 20 which via tiltable and pivotable discs 21 and 22 is carried by both trailers 2 and 5. In such case it is necessary to provide for a telescopic coupling between the trailers 2 and 5 for enabling the vehicle train to drive in curves. The telescopic coupling is arranged in connection with the pull rod 17, of the dolly 15, the forward end of which is linked at 14 to the rear end of trailer 2.

FIG. 2 shows the vehicle train when driving in a sharp bend. As will be seen the forcible steering of the rear wheel sets 9a, 9b and 12a, 12b, respectively, will turn these wheel sets oppositely in relation to the steering wheels of the tractor 1. The two other wheel sets 8a and 8b of trailer 2 will also be turned outwardly in the bend correspondingly by friction only. Consequently, the trailers will more closely follow the track of the tractor 1.

The parts 38, 43' and 43" in FIG. 2 belong to the steering devices for the wheel sets 6, 8, 9, 10 and 12 and will be explained in detail below.

FIG. 3 shows on of the rearmost wheel bogies 9a, 9b, 12a, 12b as seen in top plan view. The twin wheels 8' and 8" of the bogie are rotatable on axles 35' and 35" respectively. At the right side is also shown a brake drum 25 to which is fixed a twin wheel felly, not shown. Each axle 35' and 35" is rigidly connected with an arm 36' and 36" respectively, forming together with the axle an angle lever which is turnable about a king pin 34', 34", respectively, the bearing housings of which are numbered 33' and 33". Said housings are via forwardly directed extensions 32' and 32", respectively, of the main axle 31, fixedly connected with said axle 31. Since the king pins 34' and 34", thus, are offset forwardly, i.e. in the driving direction (see arrow 51) in relation to the respective axles 35' and 35", and the angle levers formed by 35',36' and 35",36" are linked together via a stay system 38', 38" and 40, the wheels 8' and 8" will always run parallelly steered by friction against the road.

The link connections between the levers formed by 35', 36' and 35", 36" and the stay rods 38' and 38", respectively, are numbered 37' and 37". The intermediate member 40 which is linked at 39' and 39" with the inner ends of the stay rods 38' and 38" has the form of a triangular plate, the rear corner of which has an extension 41 which is coupled with the midpoint of a double piston rod 42, the ends of which are connected with pistons located in hydraulic cylinders 43' and 43", respectively. Said cylinders are via arms 43a' and 43a", respectively, supported by the fixed axle 31 of the bogie. By means of this hydraulic mechanical system 41, 42, 43', 43" the wheel set is forcibly steered by the respective fifth wheels 4 and 18 (FIG. 2) via hydraulic connections 48' and 48". The triangular member 40 is also provided with a square opening 44 for a pin which is located behind said member and controlled by a pneumatic cylinder, not visible, to act as a reverse lock. By means of said lock the wheels 8' and 8" can be locked for travel in the forward and rearward direction only, the forcible steering being disengaged, so that the whole vehicle train may be safely reversed, when necessary. The pneumatic cylinder located behind the plate link 40 and operating the reverse lock, is controlled from the wheel house of the track 1 via an electro-mechanical connection 50.

FIG. 3 shows the rearmost bogies, such as 9a, 9b of trailer 2 and 12a, 12b of trailer 5. The other bogies which are steered by friction, such as 6, 8a and 8b of trailer 2 and 10 of trailer 5 are of the same construction, except that the stay 38 (38', 38", 40) is rigid and in one piece with the square opening arranged in the middle of same if said wheel set is to be locked when the vehicle train is to be reversed. Furthermore, the hydraulic mechanical forcible steering device 41, 42, 43', 43", 43a', 43a", of course, is also missing.

The wheels of the bogie are subjected to a downward pressure by two bellows 47' and 47" which serve, via two levers 46' and 46", to continuously keep the wheels 8' and 8" in contact with the road. The forward ends of said levers are pivotably connected with a transverse bar 45 fixed to the chassis of the trailer. Said levers carry the wheel axis 31. The rear end of said levers 46' and 46Δ is each fixed to one bellow 47' and 47", respectively, which are again fixed to the underside of the chassis. The pressure excerted by said bellows is automatically controlled by valves dependent on the load on the trailer.

I claim:

1. Steering device for a multi-axled goose-neck trailer which is coupled with a vehicle in front of said trailer, said steering device comprising wheels pivotable about a main axle and connected to stay rods for forcibly steering said wheels, said stay rods each connected to an intermediate member, said intermediate member also connected to a double piston rod, the ends of which are adapted for receiving a hydraulic signal from said vehicle.

2. Device as claimed in claim 1, in which the trailer is eight-axled, characterized in that the front wheel set is a trailing wheel set and the second, third and fourth wheel sets are fixed, the fifth and sixth wheel sets are trailing wheel sets and are steered by friction and the two rearmost wheel sets are forcibly steered.

3. Device as claimed in claim 1, in which the trailer is six-axled, characterized in that the front wheel set is a trailing wheel set and is friction-steered and the two last wheel sets are forcibly steered.

4. Device as claimed in claim 1, characterized by a reverse lock which is controlled from the wheel house of the tracking vehicle and which locks the steering of one or more of the trailing wheel sets and forcibly steered wheel sets of the trailer during reversing.

5. Steering device for a multi-axled goose-neck trailer which is coupled with a vehicle in front of it by a pivotable and tiltable fifth wheel hydraulically adapted to forcibly steer the rear-most wheel set of said goose-neck trailer in a direction opposite to the steering wheel of said vehicle in front of it, said steering device comprising wheels rotatable on respective wheel axles, said respective wheel axles rigidly connected with respective arms, said respective arms forming respective angle levers with said respective axles, said respective angle levers each rotatable about respective king pins, said respective king pins supported in respective bearing housings, each of said respective bearing housings fixedly connected to a main axle by respective forwardly directed extensions, said respective forwarding directed extensions each, at its forward end, connected by a link to the outer end of respective stay rods, each said respective stay rod, at its inner end, connected to an intermediate member, said intermediate member being triangular in shape and connected at its rear corner with the midpoint of a double piston rod, the ends of which are connected with hydraulic pistons located in hydraulic cylinders, said hydraulic cylinders supported by said fixed axle and hydraulically connected to said fifth wheel.

* * * * *